United States Patent [19]
Fee et al.

[11] Patent Number: 6,038,044
[45] Date of Patent: Mar. 14, 2000

[54] RING/MESH OPTICAL NETWORK

[75] Inventors: John A. Fee; Sridhar Nathan, both of Plano, Tex.

[73] Assignee: MCI Communications Corporation, Washington, D.C.

[21] Appl. No.: 09/026,943

[22] Filed: Feb. 20, 1998

[51] Int. Cl.[7] .............................. H04J 14/00; H04J 14/02; H04B 10/20; H04B 10/08

[52] U.S. Cl. ......................... 359/119; 359/119; 359/110; 359/128; 359/139

[58] Field of Search .................................. 359/119, 110, 359/117, 128; 370/222, 223

[56] References Cited

U.S. PATENT DOCUMENTS 5,805,320  9/1998  Kuroyanagi et al. .................... 359/117
5,870,212  2/1999  Nathan et al. ........................... 359/119

*Primary Examiner*—Leslie Pascal
*Assistant Examiner*—Mohammad Sedighian

[57] ABSTRACT

A plurality of optical cross-connect switches are freely interconnected to form a mesh type network. At least three of the optical cross-connect switches are switched to form a line-switched ring network, thereby forming a ring/mesh network. Simply by changing the switching logic of the optical cross-connect switches within the ring/mesh network, new rings can be created and existing rings can be modified, thereby providing a great deal of flexibility to make changes to the network as traffic patterns change without incurring hardware costs or significant network downtime. Another advantage of the ring/mesh design approach is that spare capacity within the line-switched ring can be utilized by the mesh network, and spare capacity within the mesh network can be utilized by the line-switched ring, thereby significantly increasing the spare efficiency.

15 Claims, 10 Drawing Sheets

FIG. 8

Switching Table 710

| Event 802 | Action 804 | Comments 806 |
|---|---|---|
| Network Initiation | Switch ports: 1-16; 2-10; 3-7; 4-5; and 8-9. | Normal conditions - optical signals are routed through working fibers 301, 302, 310 and 313 |
| B-D span cut | Disconnect ports: 3-7; 8-9 Switch ports: 3-9 | Ring failure - route traffic onto spare channels |
| A-B span cut | If there are no failures in ring network 202, then disconnect ports: 1-16; 8-9 switch ports: 1-9 | Mesh failure - route mesh traffic onto ring spare channel only if there isn't a ring failure |
| ... | ... | ... |

RING/MESH OPTICAL NETWORK

BACKGROUND OF THE INVENTION

1. Field of the Invention

This invention relates to the field of optical data transport networks.

2. Related Art

There are two predominant network architectures for creating optical data transport networks. These network architectures are commonly referred to as "ring" and "mesh."

In a ring network architecture each node of the network is connected to exactly two adjacent nodes to form a ring topology. When a break occurs in the ring, data traffic is looped back along a reverse direction spare path to bypass the break in the ring. Present day optical ring networks are implemented with devices known as add/drop multiplexers (ADMs). An ADM is an all optical switch that either chooses (or is commanded to select) either a working path or spare restoration path and switches traffic itself to these paths.

The ADM ring architecture is attractive for its simplicity and recovery speed, which is around 50 milliseconds. A drawback of the ADM ring architecture is that it is impractical to implement large networks as a single ring. Another drawback is that ADM ring networks require that there be a 1:1 protect ratio (i.e., one spare connection for each working connection) in order to implement ring recovery.

In a mesh architecture nodes of a network can be connected to more than two other nodes, and a given signal may have many possible routes by which to traverse the network. A network covering, a large geographical area is amenable to the mesh design. As the network expands, nodes can simply be added at the periphery and be connected to other nodes in any manner as needed. In addition, nodes can be easily added inside the network to provide more dense coverage of an area as needed. With respect to network restoration, the mesh architecture allows for sophisticated actions to be taken in response to a failure. For example, if a failure of several connections occurs suddenly within the network, the switches within the network can perform a coordinated switching operation to divert traffic around the failure. For this purpose, most of the spans within a mesh network are equipped with extra connections (i.e., spare connections) that are used for emergency backup when one or more working connections fail.

Whereas an ADM ring architecture requires a 1:1 protect ratio, the mesh architecture allows a considerably lower protect ratio due to the flexibility of the mesh switching. The tradeoff is that mesh restoration is more complex and more time consuming. Mesh restoration requires on the order of 1 or 2 seconds to restore a span failure.

What is needed is a network design approach that exhibits the simplicity and fast switching of an ADM ring network yet offers the spare efficiency and ease of growth characteristics of a mesh network.

SUMMARY OF THE INVENTION

The present invention provides a network design that exhibits the simplicity and fast switching of ADM ring networks yet offers the spare efficiency and ease of growth characteristics of mesh networks. The present invention accomplishes this by using optical cross-connect switches, as opposed to ADMs, to create self-healing optical ring networks. By creating self-healing optical ring networks using optical cross-connect switches the ring networks can be seamlessly integrated with a mesh network of optical cross-connect switches, thereby creating a ring/mesh network in which an optical cross-connect switch can participate in both the ring and mesh network. An optical cross-connect switch participates in both the ring and mesh network by provisioning a first set of ports within the optical cross-connect switch to support ring traffic and by provisioning a second set of ports within the optical cross-connect switch to support mesh traffic.

A ring/mesh network according to the present invention is a network of freely interconnected optical cross-connect switches wherein one or more line-switched ring configurations are created from at least three of the optical cross-connect switches. Simply by changing the switching logic of the optical cross-connect switches within the ring/mesh network, new optical rings can be created and existing optical rings can be modified. This gives network managers and others a great deal of flexibility to make changes to the network as traffic patterns change without incurring hardware costs or significant network downtime. The switching logic of optical cross-connect switches can be expressed in switching tables or set of logic equations. The switching logic may also be expressed by a data structure of provisioning parameters associated with each switch port. The present invention, however, is not intended to be limited to any particular switching logic.

Another advantage of the ring/mesh network design is that it can provide a high spare efficiency. For example, multiple rings can be created having a common span. Spare capacity can then be shared among these rings, thereby lowering the spare to working capacity ratio from 1:1 to 1:N. Furthermore, the spare capacity of the ring networks can also be shared with the mesh network, thereby increasing spare efficiency. That is, spare capacity within a ring network can be used to carry mesh traffic in the event of a failure within the mesh network. However, in one example, the ring networks can have priority of use with respect to ring spare capacity.

Still another advantage of implementing ring networks using optical cross-connect switches is that the ring networks can be of arbitrary depth and can easily scale as traffic demands increase. For example, using 18 port OCCSs, one can construct a 6 fiber ring, or with a 24 port OCCSs, an 8 fiber ring network can be built. The maximum number of fibers an optical ring can be constructed with using OCCSs is only limited by the port counts of the OCCSs. Conventional optical ring systems constructed using ADMs, however, can support only two/four fiber bi-directional rings or two fiber unidirectional path switching.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 8 illustrates an example switching table.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

To more clearly delineate the present invention, an effort is made throughout the specification to adhere to the following term definitions as consistently as possible.

The term "span," and equivalents thereof refer to a path or route between any two nodes. A span can extend between adjacent or non-adjacent nodes. A span can extend between intermediate nodes, which include optical switching elements, and/or endpoint nodes, which include line terminal equipment (LTE).

The term "optical channel," "channel," and equivalents thereof, refer to any type of optical connection for transporting an optical signal between two points.

The present invention provides a network design that exhibits the simplicity and fast switching of ring networks yet offers the spare efficiency and ease of growth characteristics of mesh networks. The present invention accomplishes this by implementing ring networks using optical cross-connect switches as opposed to using add-drop multiplexers. By implementing ring networks with optical cross-connect switches, the ring networks can be integrated with an optical cross-connect mesh network. Optical cross-connect switches that implement the ring networks can form part of the mesh network.

The seamless integration of the ring and mesh networks enable network engineers to configure ring networks within a mesh optical cross-connect switch network by provisioning optical cross-connect switches to support mesh and ring topologies. To configure additional ring networks, network engineers need only modify the switching logic of the optical cross-connects within the ring/mesh network and perhaps add additional capacity to the network. The switching logic of optical cross-connect switches can be expressed in switching tables or set of logic equations. The switching logic may also be expressed by a data structure of provisioning parameters associated with each switch port. For ease of understanding the present invention, the invention will be described in an environment where the switching logic is expressed in switching tables. The present invention, however, is not intended to be limited to such an environment.

Figure 1:
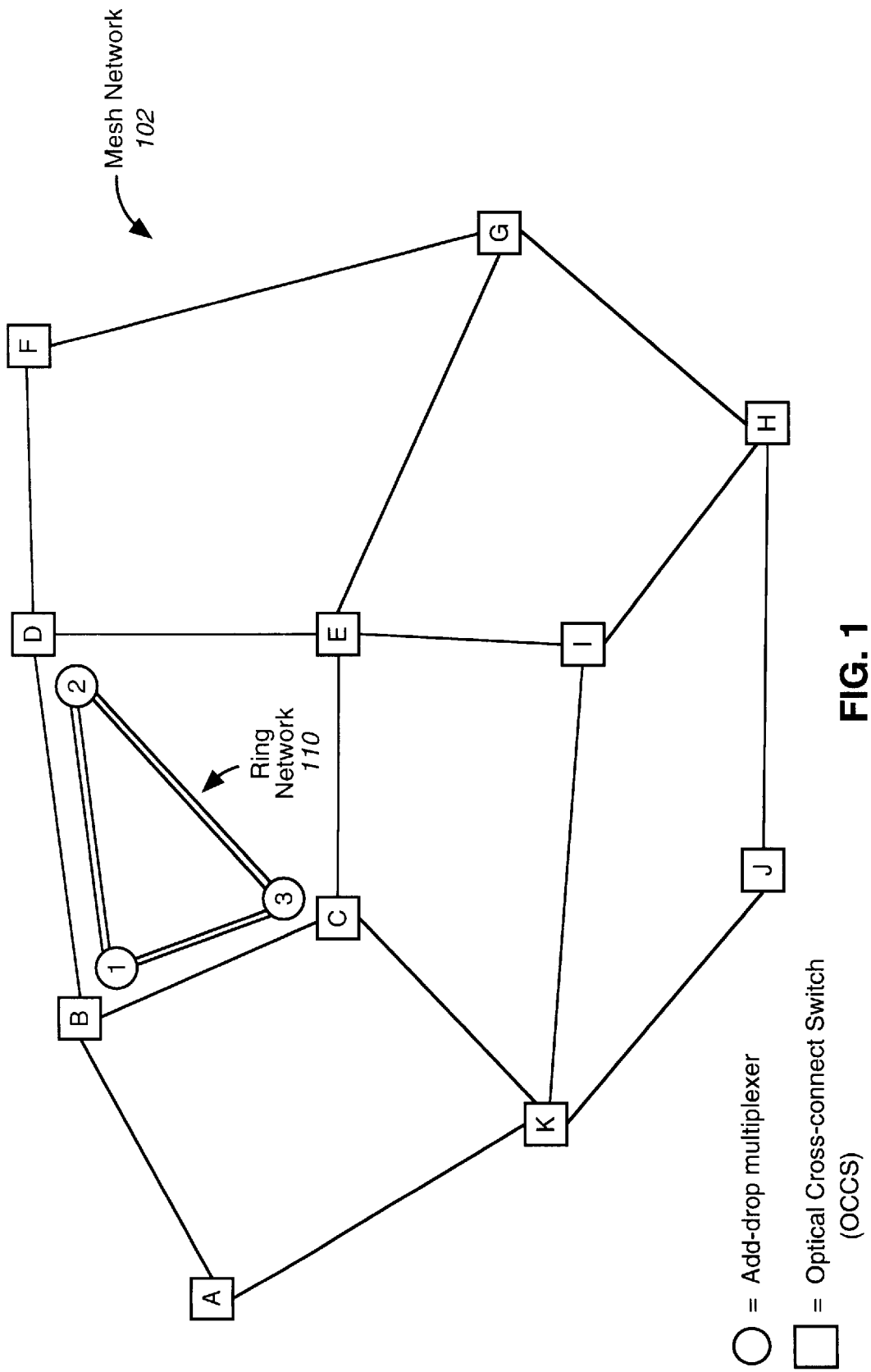
FIG. 1 is a network diagram illustrating a mesh network consisting of optical cross-connect switches and a ring network consisting of add-drop multiplexers.

FIG. 1 illustrates the problem recognized by the inventors in integrating mesh and ADM ring networks where significant traffic demand exists among nodes B, C, and D. FIG. 1 shows a network having an optical mesh network 102 and a conventional ADM ring network 110. Due to the traffic demands among nodes B, C, and D, ADMs 1, 2, and 3 are placed at those nodes to form ring network 110. Optical cross-connect switches can be placed at nodes A-K, where the traffic is not as critical, to form mesh network 102.

Whereas the network design of FIG. 1 suffices for the situation where traffic is heaviest and most important among locations B, C, and D, a problem arises when some of the initial design parameters change. For example, some time after the network has been deployed, new traffic demands might make locations B, D, and E a candidate for a ring network in addition to or in replace of the initial ring network 110. In fact, at any given point of time, as recognized by the inventors, the network might best be implemented as entirely mesh or as any combination of rings.

The problem with the design of FIG. 1 is that conventional ADM ring network 110 is permanently implemented as a ring structure using ADMs. Consequently, if there were a subsequent desire to alter the ring or convert it to be part of the mesh network, hardware would have to be retrofitted incurring considerable cost and network downtime. It would be impractical to alter the network design on the fly, as a function of the time of day, for example. Another disadvantage of implementing ring and mesh networks using different hardware is that it complicates the sharing of spare capacity that exists in each network.

Figure 2:
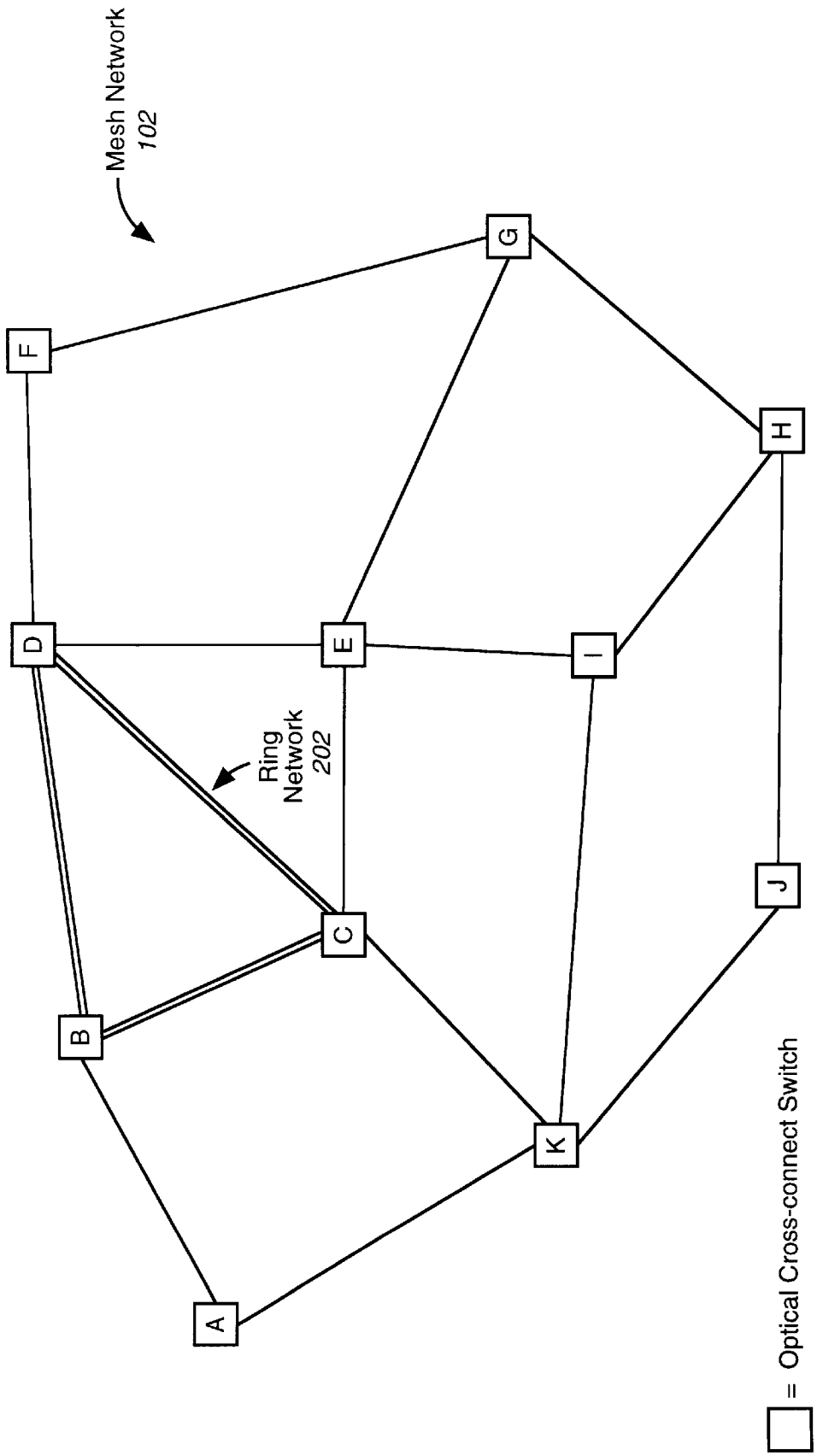
FIG. 2 is a network diagram illustrating a network design according to one embodiment of the present invention.

FIG. 2 is a network diagram illustrating a network design according to one embodiment of the present invention. The network design of the present invention overcomes the disadvantages of the network design approach shown in FIG. 1 by implementing both ring and mesh networks using optical cross-connect switches (OCCSs). An OCCS is a switch that switches an optical signal from one port to another without optical-to-electrical conversion and is bit-rate independent. The switching of an OCCS is commonly controlled by an OCCS controller (see FIG. 7). OCCS controllers detect failures within a network by receiving failure indications from line terminating equipment (LTEs) or other fast, reliable fault detection system such as is described in copending U.S. application Ser. No. 08/582,845, entitled "Method and System for Detecting Optical Faults in a Network Fiber Link," filed by John A. Fee on Dec. 29, 1995, assigned to the assignee of the present invention and incorporated by reference herein. Another fast, reliable fault detection method and system is described in copending U.S. application Ser. No. 08/580,391 entitled, "Method and System for Detecting Optical Faults Within the Optical Domain of a Fiber Communication Network." filed by Shoa-Kai Liu on Dec. 28, 1995, assigned to the assignee of the present invention and incorporated by reference herein. Upon receiving a failure indication, an OCCS controller will consult a switching table to determine the switching commands that it should send to its corresponding OCCS. In this manner, an OCCS switches traffic to avoid failures in the network.

Using the OCCSs to implement both mesh and ring networks allows for the seamless integration of ring network 202 and mesh network 102. By integrating ring and mesh networks, as shown in FIG. 2, the present invention offers numerous features and advantages to overcome the disadvantages of the prior network designs.

Figure 3:
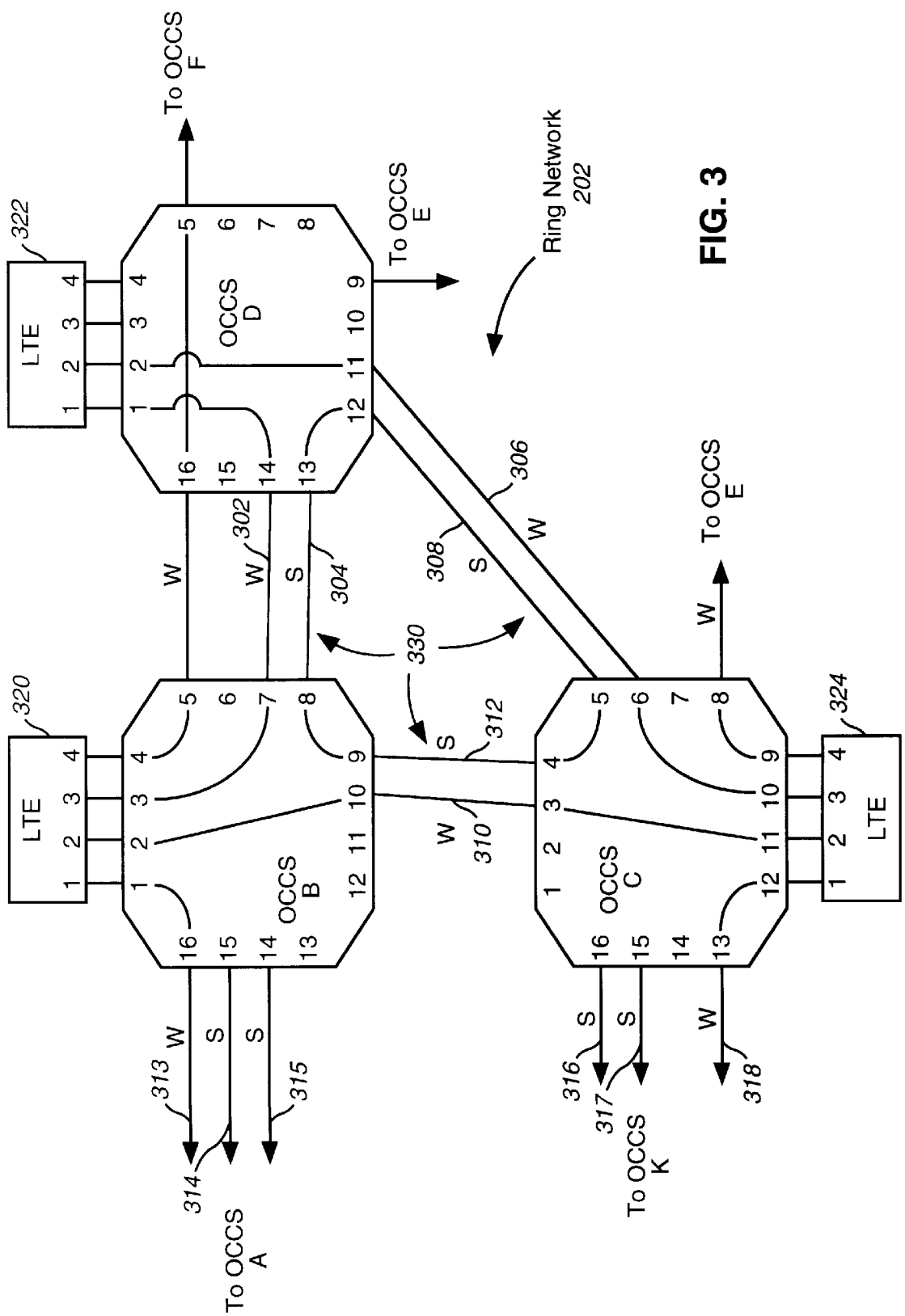
FIG. 3 illustrates in greater detail an example configuration of optical cross-connect switches in the ring network of FIG. 2.

According to the present invention, ring network 202 is formed using OCCSs B, C, an D of mesh network 102. OCCSs B, C, and D participate in both ring network 202 and mesh network 102 by provisioning a first set of ports within each OCCS to support ring traffic and by provisioning a second set of ports to support mesh traffic. FIG. 3 illustrates in greater detail the configuration of OCCSs B, C, and D. As shown in FIG. 3, ports 2, 3, 7, 8, 9, 10 of OCCS B are provisioned to support ring traffic. Ports 1, 4, 5, and 16 are provisioned to support working mesh traffic. Ports 14 and 15 are provisioned to support spare mesh traffic. Mesh traffic can include traffic between OCCSs or traffic between an LTE and an OCCS. Like OCCS B, OCCS C and OCCS D both have a first set of ports to support ring traffic and a second set of ports to support working and/or spare mesh traffic.

In addition to provisioning the ports of OCCS B, C, and D, ring network 202 is formed by providing at least one working optical channel (w) and one spare optical channel (s) between each OCCS that forms ring network 202. Specifically, working optical channel 302 and spare optical channel 304 optically couple OCCS B to OCCS D. Working optical channel 306 and spare optical channel 308 optically couple OCCS D to OCCS C. Lastly, working optical channel 310 and spare optical channel 312 are optically coupled between OCCS C and OCCS B.

OCCSs B, C, and D are switched such that port 2 of LTE 320 is optically coupled with port 2 of LTE 324 using working optical channel 310. Port 3 of LTE 320 is optically coupled with port 1 of LTE 322 using working optical channel 302. Port 3 of LTE 324 is optically coupled with port 2 of LTE 322 using working optical channel 306.

OCCSs B, C, and D are also switched to form spare optical channel ring 330, which is used for carrying traffic in the event of a failure in one of the working optical channels 302, 306, or 310. As shown in FIG. 3, spare optical channel ring 330 includes spare optical channels 304, 308, and 312, which are part of ring network 202. Spare optical channel ring 330 is created by having OCCS B connect spare optical channel 304 to spare optical channel 312, OCCS D connect spare optical channel 304 to spare optical channel 308, and OCCS C connect spare optical channel 308 to spare optical channel 312. OCCS B connects spare optical channel 304 to spare optical channel 312 by switching port 8 to port 9. OCCS D connects spare optical channel 304 to spare optical channel 308 by switching port 13 to port 12. OCCS C connects spare optical channel 308 to spare optical channel 312 by switching port 5 to port 4.

Figure 4:
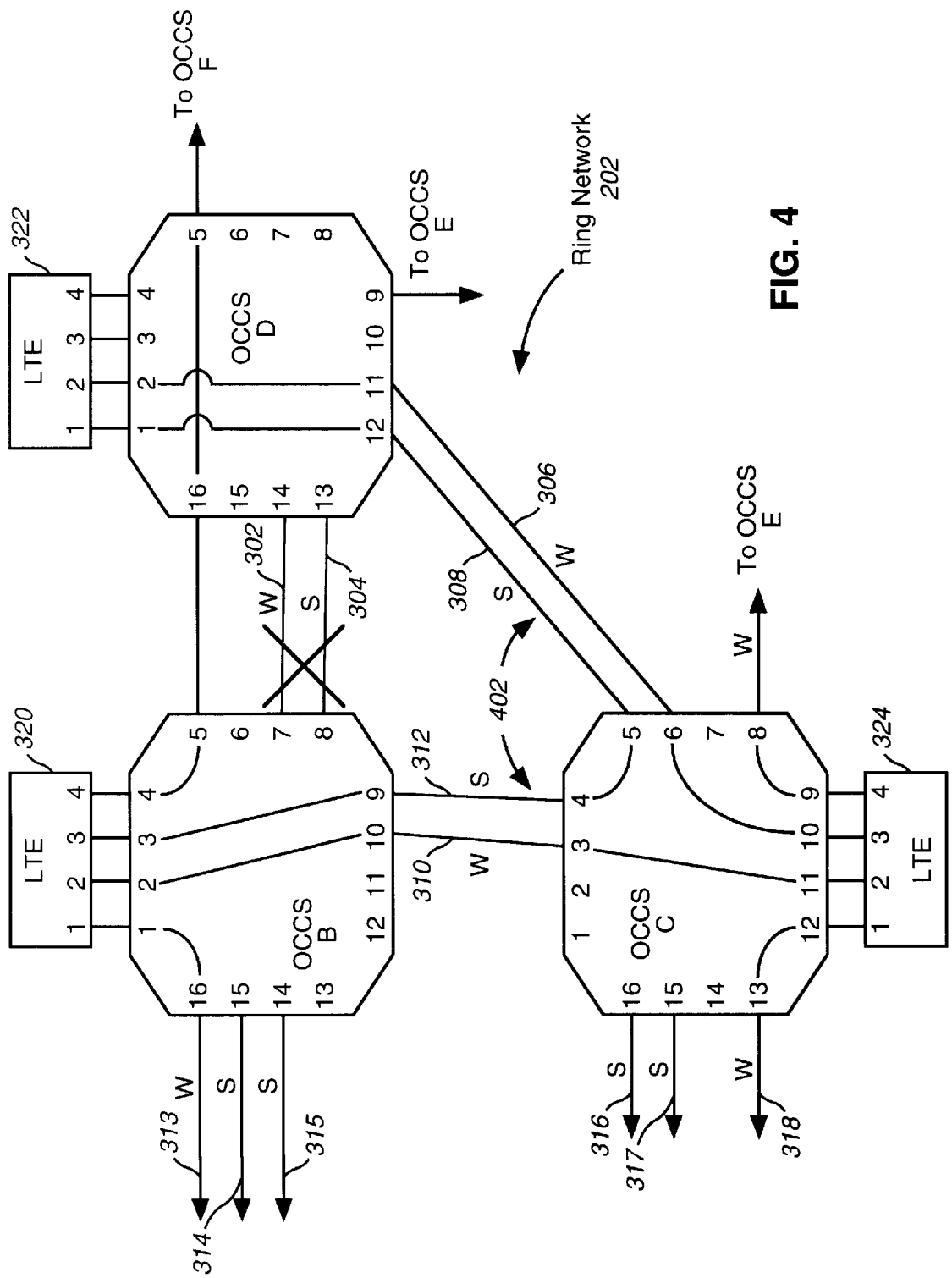
FIG. 4 illustrates an example ring failure scenario in the ring network of FIG. 2.

Ring network 202 operates with fast, self-healing behavior similar to that of ring network 110. When a failure occurs in one of the working optical channels 302, 306, 310 of ring network 202, data traffic is looped back along a reverse direction spare path to bypass the failed working optical channel. An example failure scenario is shown in FIG. 4. FIG. 4 illustrates a break in the ring between OCCS B and OCCS D. To bypass the ring failure, data traffic between OCCS B and OCCS D is carried by spare path 402, which includes spare optical channels 312 and 308. The data traffic is placed on the spare path simply by having OCCS B switch the optical signal received on port 3 to port 9, instead of switching it to port 7, and by having OCCS D switch the optical signal received on port 12 to port 1, instead of switching it to port 13. Because only this simple switching need take place to recover from a ring failure, recovery occurs very quickly.

If spare optical channel ring 330 was not created, then it would have been necessary for OCCS C to connect spare optical channel 312 to spare optical channel 308 in response to the failure. But because spare optical channel ring 330 was initially created, OCCS C did not have to perform any actions for ring recovery to occur. In short, spare optical channel ring 330 facilitates ring recovery by reducing the number of OCCSs that have to respond to a span failure. A system and method for creating line-switched ring networks using OCCSs is also described in copending U.S. Application Attorney Docket No. RIC-97-029 (1575.2880000), entitled "Self-Healing Optical Network," filed by Sri Nathan and John A. Fee on Jan. 14, 1998, assigned to the assignee of the present invention and incorporated by reference herein.

As discussed above, ring network 202 maintains the simplicity and fast switching of ring networks implemented using ADMs. Furthermore, because ring network 202 is integrated with mesh network 102, the sharing of spare capacity between the networks is facilitated. As an example, spare optical channels 304, 308, 312 of ring network 202 can easily be used as backup paths by mesh network 102 in the event of a failure in the mesh network. For example, assuming a failure in mesh network 102 occurs in working optical channel 313, which optically couples OCCS A to OCCS B, the traffic from A to B can be re-routed through OCCS K and OCCS C (see FIG. 5). The recovery path from OCCS C to OCCS B uses spare optical channel 312.

Figure 5:
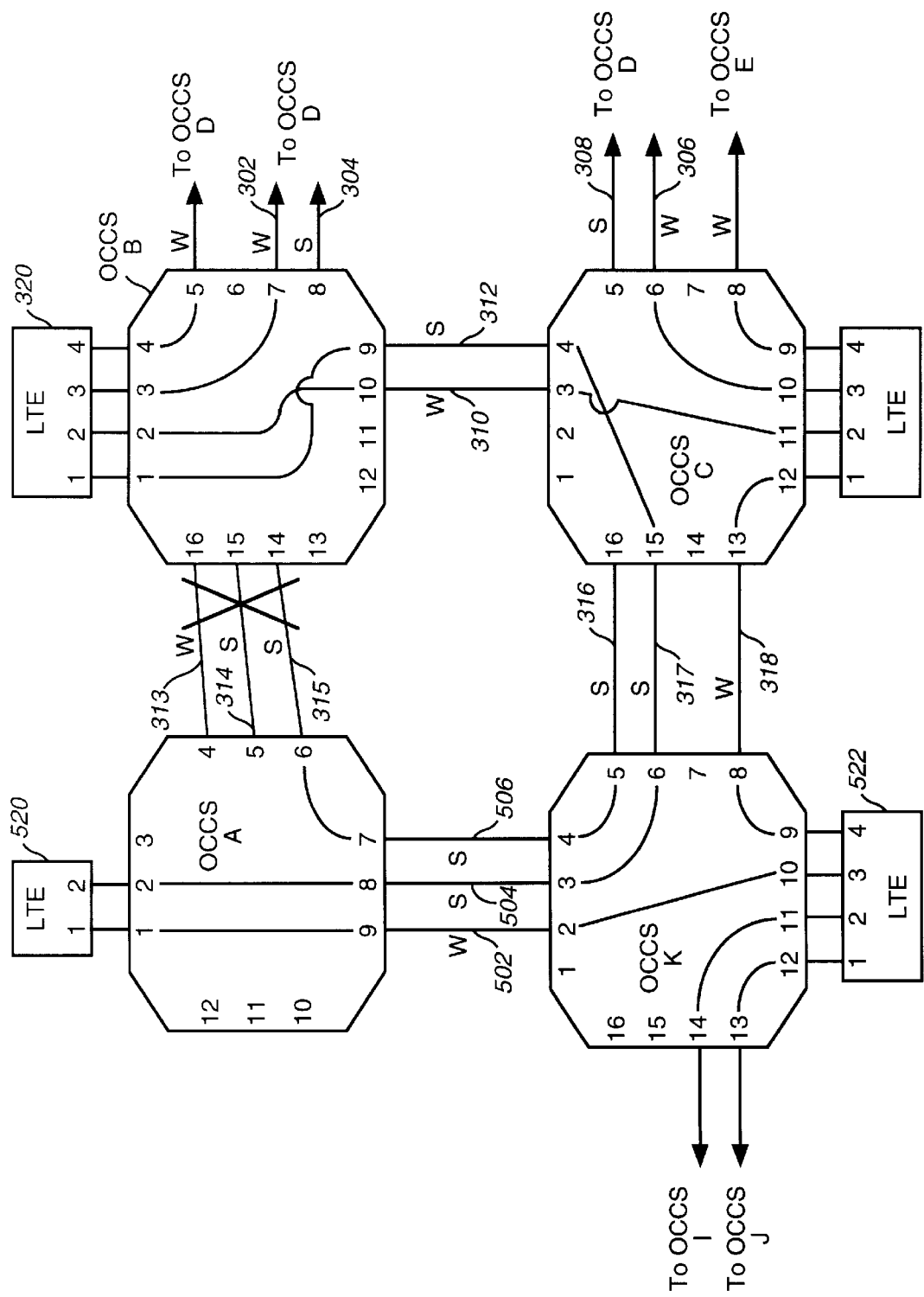
FIG. 5 illustrates an example configuration of optical cross-connect switches in the ring network of FIG. 2 in response to a failure occurring in a working optical channel within the mesh network.

FIG. 5 illustrates the configuration for OCCSs A, B, C and K in response to a failure occurring in working optical channel 313 of mesh network 102. As shown in FIG. 5, port 1 of LTE 320 is optically coupled to port 2 of LTE 520 through OCCS B, C, K, and A and spare optical channels 312, 317, and 504. In the configuration shown in FIG. 5, spare optical channel 312, which is part of ring network 202, is utilized by the mesh network. By sharing spare optical channels between the ring and mesh networks, the network realizes a significant increase in spare efficiency. Ring network 202 can be given priority of use over spare optical channel 312 so that mesh traffic will be carried by spare optical channel 312 only when there are no failures in ring network 202.

In addition to mesh network 102 being able to utilize spare capacity in ring network 202, ring network 202 can utilize spare capacity within mesh network 102. Ring networks constructed using ADMs are not able to recover from more than one failure within the ring. However, the network design of the present invention enables ring networks to recover from more than one failure by utilizing spare capacity within the mesh network. This is a powerful feature not found in conventional optical ADM ring networks.

Figure 6:
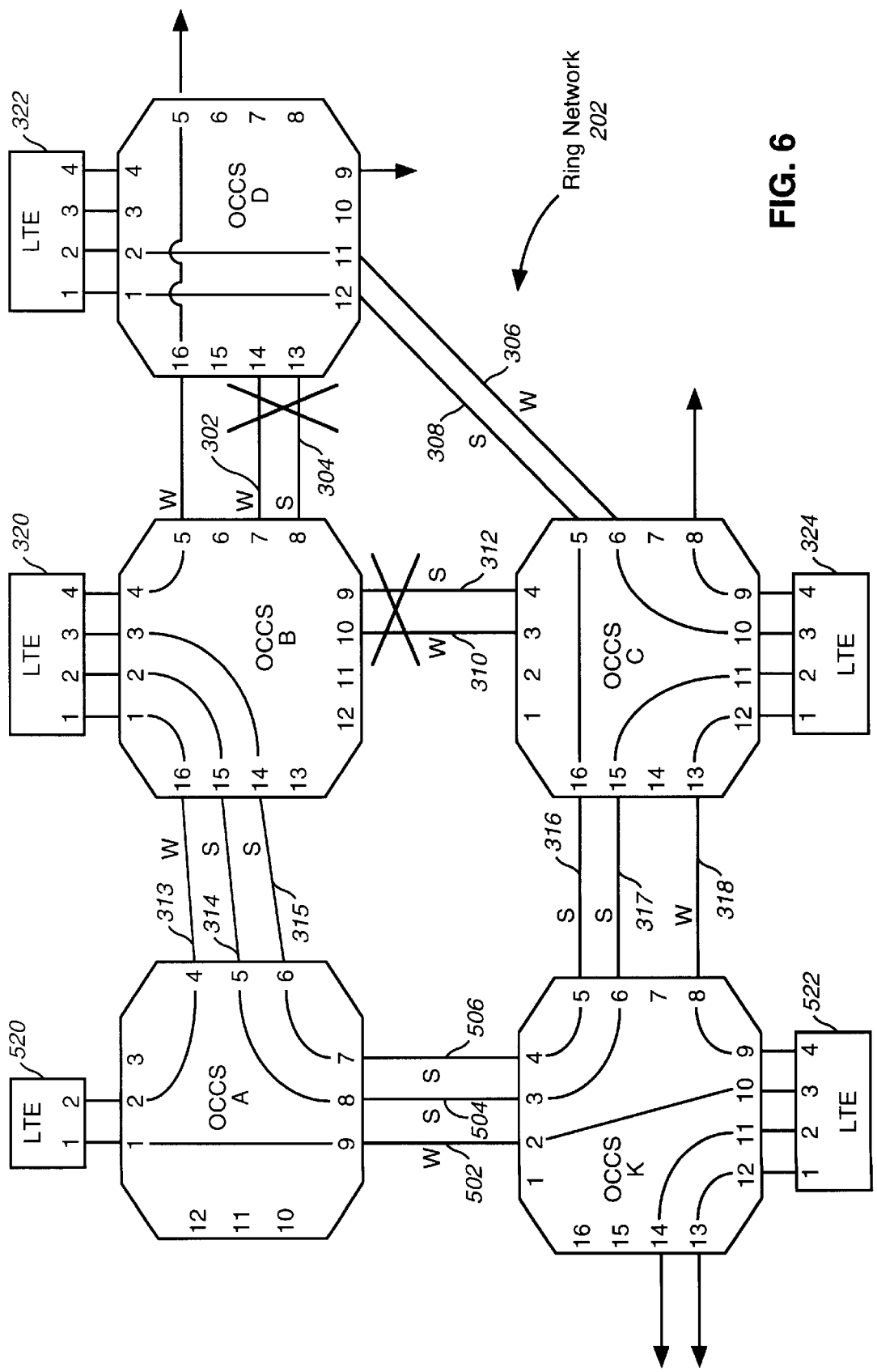
FIG. 6 illustrates an example failure scenario where more than one failure has occurred within a ring network.

FIG. 6 illustrates an example failure scenario where more than one failure has occurred within ring network 202. In the example of FIG. 6, there is a failure between OCCS B and OCCS D and a failure between OCCS B and OCCS C. To recover from more than failure in ring 202, ring traffic will be switched onto spare capacity within mesh network 102. As shown in FIG. 6, port 2 of LTE 320 is now optically coupled with port 2 of LTE 324 through optical cross-connect switches B, A, K, and C and spare optical channels 314, 504, and 317. These spare optical channels are spare capacity within mesh network 102. Similarly, port 3 of LTE 320 is optically coupled to port 1 of LTE 322 through optical cross-connect switches B, A, K, C, and D and spare optical channels 315, 506, 316, and 308. Spare optical channels 315, 506, and 316 are spare capacity of mesh network 102. The network shown in FIG. 6 is but one example of how ring network 202 can utilize spare capacity within mesh network 102. A system and method for enabling ring networks to utilize spare capacity within mesh networks is also described in copending U.S. Application Attorney Docket No. RIC-97-131 (1575.2950000), entitled "System and Method for Increasing the Robustness of an Optical Ring Network," filed by Sri Nathan on Jan. 14, 1998, assigned to the assignee of the present invention and incorporated by reference herein.

Additionally. in the interest of brevity FIG. 2 only shows one ring network 202 configured within mesh network 102. The present invention is not intended to be so limited. Any arbitrary number of rings can be configured within mesh network 102 according to the present invention, as would be apparent to a person skilled in the art given this description. For example, using the same technique described above to create a ring connecting nodes B, C, and D, a ring connecting nodes E, G, H, and I or K, I, H, and J, can also be created. Additionally, if two rings are created wherein the rings share a common span, such as rings B-C-D and A-B-C-K, then the opportunity to share a spare optical channel between the two rings is presented. A system and method for sharing a spare optical channel among two or more ring networks is described in copending U.S. Application Attorney Docket No. RIC-97-029 (1575.2880000), entitled "Self-Healing Optical Network," filed by Sri Nathan and John A. Fee on Jan. 14, 1998, assigned to the assignee of the present invention and incorporated by reference herein, and copending U.S. Application Attorney Docket No. RIC-97-076 (1575.2640000), entitled "System and Method for Sharing a Spare Channel Among Two or More Optical Ring Networks," filed by Sri Nathan and John A. Fee on Jan. 14, 1998, assigned to the assignee of the present invention and incorporated by reference herein.

Figure 7:
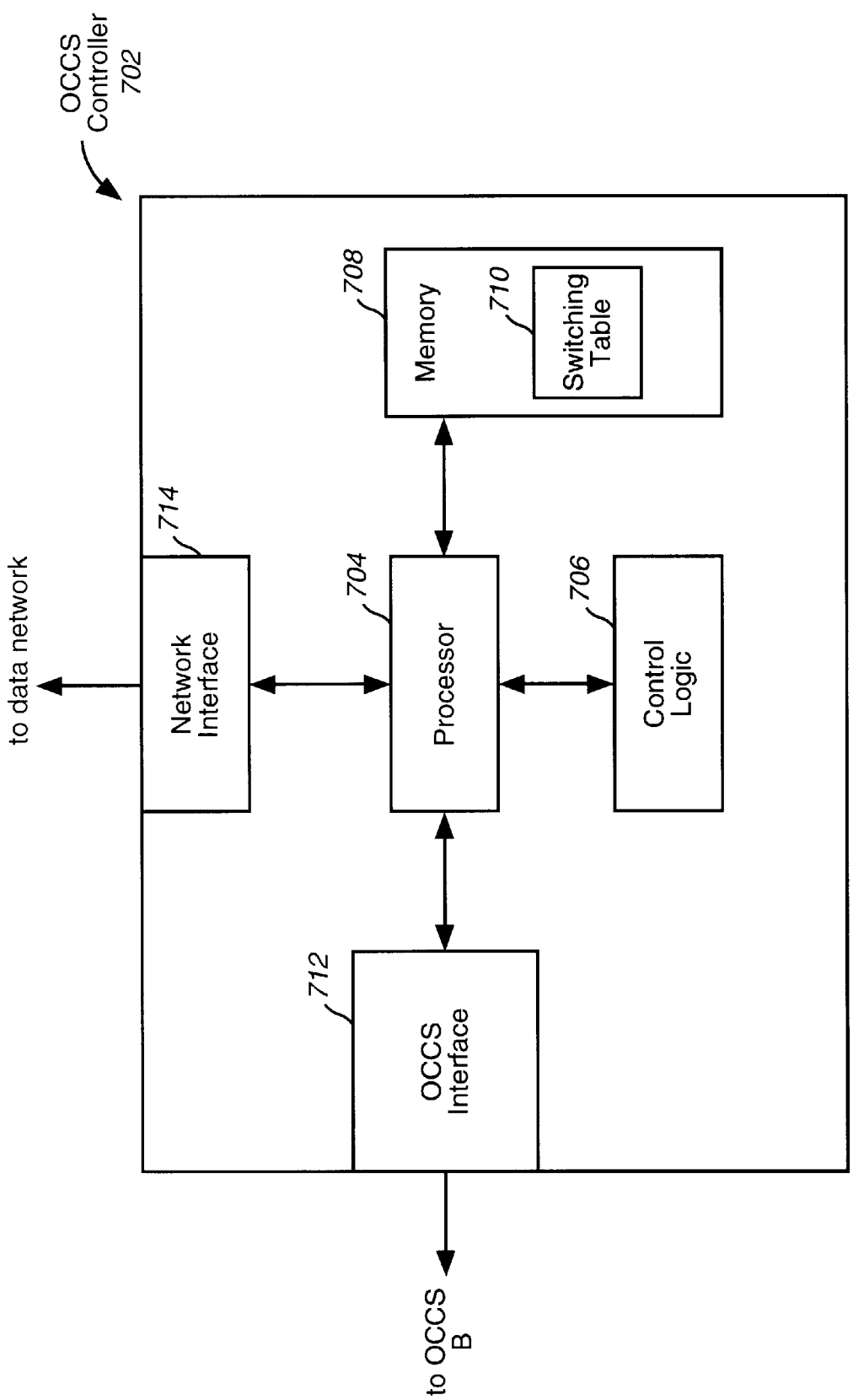
FIG. 7 is a block diagram illustrating an optical cross-connect switch controller.

As noted above, the switching of an OCCS is controlled by an OCCS controller. OCCS controllers detect failures within a network by receiving failure indications from line terminating equipment (LTEs) or other fast, reliable fault detection systems. Upon receiving a failure indication, an OCCS controller consults a switching table to determine the switching commands that it should send to its corresponding OCCS. FIG. 7 is a diagram illustrating the OCCS controller 702 corresponding to OCCS B. OCCS controller 702 includes a system processor 704, control logic (e.g., computer software) 706 to be executed by system processor 704, memory 708 for storing switching table 710, OCCS interface 712 for coupling OCCS controller 702 to OCCS B, and data network interface 714 for coupling OCCS controller 702 to a data network for receiving network failure indications.

Switching table 710 determines the port configuration of OCCS B. As shown in FIG. 8, switching table 710 includes three columns. An event column 802, an action column 804, and a comments column 806. The event column contains network events to which OCCS B responds. For each network event listed in the event column, there is a corresponding switching action that OCCS B performs in response to the event. These switching actions are stored in the switching column 804.

For example, one network event shown in event column 802 is the network initiation event. The switching action that OCCS B performs in response to this event is to switch port 1 with port 16, port 2 with port 10, port 3 with port 7, port 4 with port 5, and port 8 with port 9, as shown in action column 804. The result of OCCS B performing these switching actions can be seen by examining OCCS B as illustrated in FIG. 3. Another event shown in event column 802 is a B-D span cut event. In response to this event, action column 804 directs OCCS B to disconnect port 3 from port 7, disconnect port 8 from port 9, and switch port 3 to port 9. FIG. 4 illustrates the configuration of OCCS B in the event of a B-D span cut. Another event shown in event column 802 is an A-B span cut event. If spare optical channel 312 is not being used to restore optical ring network 202, then in response to an A-B span cut OCCS B disconnects port 8 from port 9, disconnects port 1 from port 16, and switches port 1 with 9. In this manner ring network 202 is given priority over the spare channels that comprise the ring. FIG. 5 illustrates the configuration of OCCS B in the event of an A-B span cut.

Each OCCS within mesh network 102 is associated with a switching table equivalent to the one shown in FIG. 8. Simply by changing the contents of the switching tables, new rings within mesh network 102 can be formed without incurring a significant amount of network downtime and without provisioning new hardware.

Another advantage to implementing rings using optical cross-connect switches is that it enables one to implement rings of arbitrary, depth and to scale the size of the rings as needed. Rings built using ADMs are limited to four fibers. Consequently, when traffic is increased such that a four fiber ring is insufficient to handle the increase, a new ring must be created. With the present invention, however, an N fiber ring can be built by using optical cross-connect switches having at least 3N ports. The ability to configure an N fiber ring provides a great deal more flexibility than an ADM ring network, which is limited to four fibers. As traffic grows, the ring can simply grow along with it, as opposed to having to build an entire new ring to supplement the existing ring.

Figure 9:
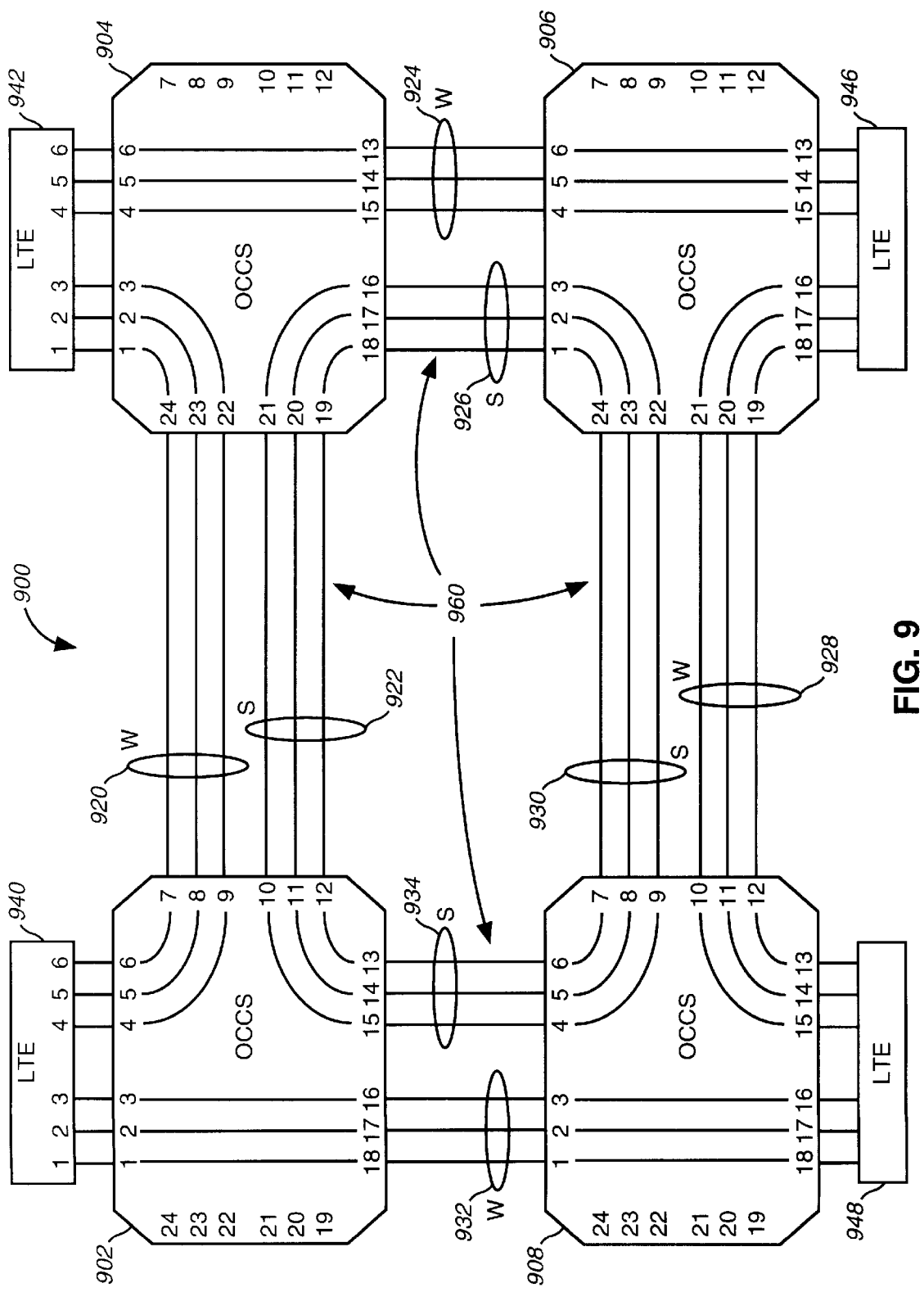
FIG. 9 is diagram illustrating a four node six fiber line-switched optical ring network according to the present invention.

An example four node six fiber ring 900 according to the present invention is illustrated in FIG. 9. As shown in FIG. 9, four OCCSs 902, 904, 906, and 908 are configured to form ring network 900. Each of the four OCCSs has at least 18 ports. OCCS 902 is optically coupled to OCCS 904 by three working optical channels 920 and by three spare optical channels 922. In a like manner, OCCS 902 is optically coupled to OCCS 908 by working optical channels 932 and spare optical channels 934. OCCS 904 is optically coupled to OCCS 906 by working optical channels 924 and spare optical channels 926. OCCS 906 is optically coupled to OCCS 908 by working optical channels 928 and spare optical channels 930. Ring network 900 is switched to form three spare optical channel rings 960 using spare optical channels 922, 926, 930 and 934.

Figure 10:
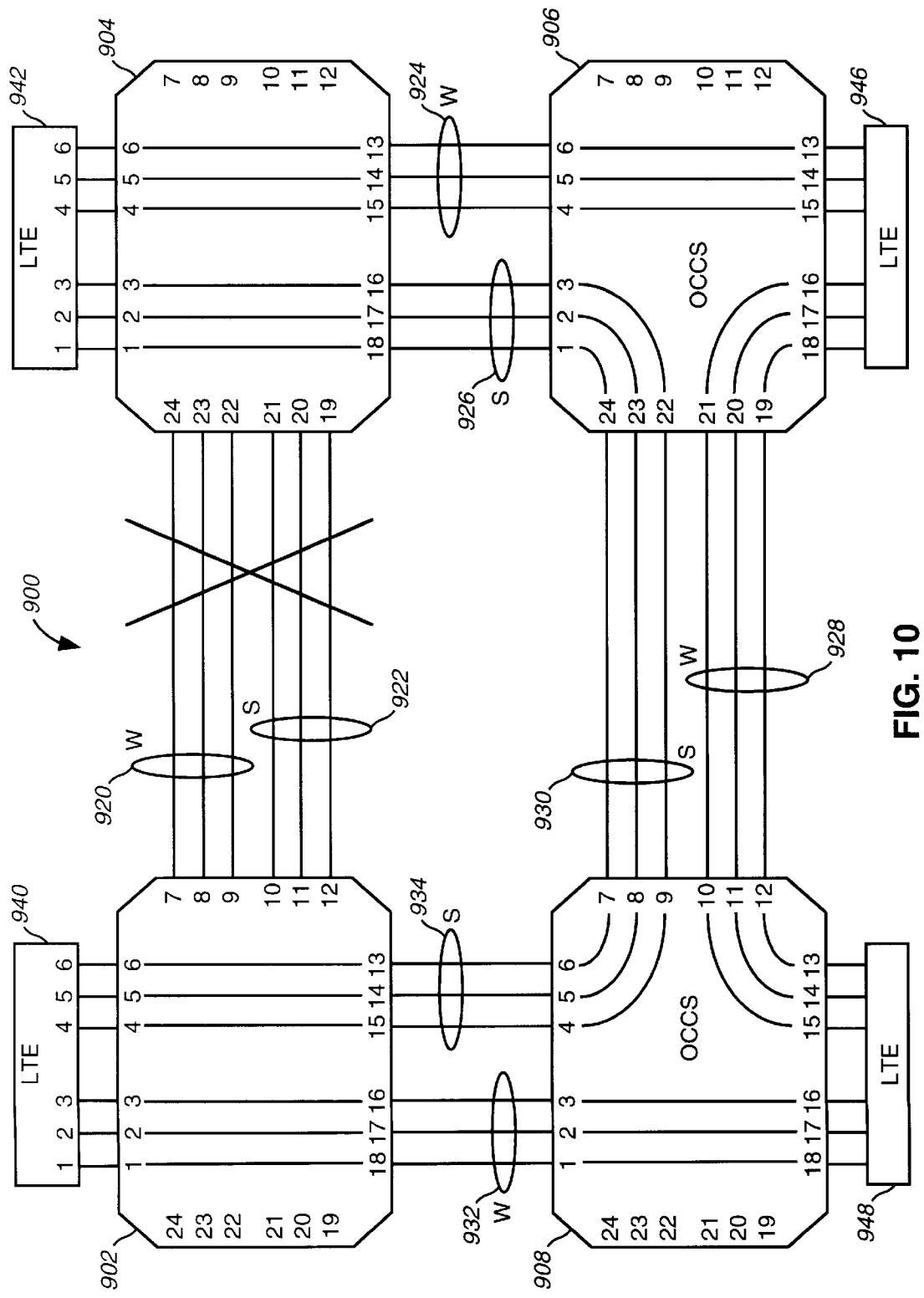
FIG. 10 illustrates an example failure scenario for the ring network of FIG. 9.

Ring network 900 operates equivalently to ring network 202. When a failure occurs in ring network 900, working traffic is switched onto a spare path in the opposite direction to avoid the failure (see FIG. 10). FIG. 10 illustrates an example failure scenario for ring network 900. Data traffic between ports 4,5,6 of LTE 940 and ports 1,2,3 of LTE 942 is normally carried over working optical channels 920 (see FIG. 7). When a failure occurs in working optical channels 920, this failure will be detected by an OCCS controller and/or network management system, for example, and a switch command will be transmitted to OCCS 902 and OCCS 904. The switch command sent to OCCS 902 will cause OCCS 902 to disconnect ports 4, 5, 6 of LTE 940 from working optical channels 920 and to optically couple those ports to spare optical channels 934 by optically coupling port 4 to port 15, port 5 to port 14 and port 6 to port 13 of OCCS 902, as shown in FIG. 10. Similarly, the switch command sent to OCCS 904 will cause OCCS 904 to disconnect ports 1,2, and 3 of LTE 942 from working optical channels 920 and to optically couple those ports to spare optical channels 926 by optically coupling port 1 to port 18, port 2 to port 17, and port 3 to port 16 of OCCS 904. Spare optical channels 926 are optically coupled to spare optical channels 934 through spare optical channels 930 and OCCSs 906 and 908. Thus, spare optical channels 926, 930, and 934 provide an alternate data traffic path that allows optical data signals to be transmitted between ports 4, 5, and 6 of LTE 940 and ports 1,2, and 3 of LTE 942, thereby restoring the network when a failure occurs in working optical channels 920.

As would be apparent to a person skilled in the art given the above description of a six fiber optical ring, the present invention can be used to create an N fiber optical ring, where N is a positive integer. An N fiber ring can be built by using optical cross-connect switches having at least 3N ports. As stated above, the ability to configure an N fiber ring provides a great deal more flexibility than an ADM ring network, which is limited to four fibers.

While various embodiments of the present invention have been described above, it should be understood that they have been presented by way of example, and not limitation. It will be understood by those skilled in the relevant art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. An optical network including a first optical ring network within an optical mesh network, comprising:
    a plurality of optical cross-connect switches including first, second, and third optical cross-connect switches; and
    a plurality of working and spare optical channels to interconnect said plurality of optical cross-connect switches to form the optical mesh network, wherein the first optical ring network includes said first, second, and third optical cross-connect switches, and includes at least three spare optical channels, wherein one of said at least three spare optical channels is shared with the mesh network such that in the event of a failure in the mesh network said one of said at least three spare optical channels carries data traffic that originated in mesh network, and at least three working optical channels, wherein a working optical channel and a spare optic channel are provided between each pair of adjacent optical cross-connect switches in the first optical ring network, wherein the first optical ring network includes means for establishing a priority of use of said spare optical channel shared with the mesh network such that said spare optical channel shared with the mesh network is utilized by the mesh network only if there are no ring failures.

2. The optical network of claim 1, wherein the first optical ring network further comprises a spare optical channel ring, said spare optical channel ring comprising said at least three spare optical channels.

3. The optical network of claim 1, further comprising a second optical ring network within the optical mesh network.

4. The optical network of claim 3, wherein said first and second optical ring networks have a common span, and wherein a spare optical channel is shared between said first and second optical ring networks.

5. The optical network of claim 1, further including means for utilizing spare capacity within the mesh network to recover from more than one failure within the first optical ring network.

6. An optical network, comprising:
    a plurality of optical cross-connect switches, including first, second, and third optical cross-connect switches;
    a plurality of spare optical channels, and
    a plurality of working optical channels, wherein
    said plurality of optical cross-connect switches are optically coupled in a ring configuration using said plurality of working optical channels and said plurality of spare optical channels such that N spare optical channels and N working optical channels are provided between each pair of adjacent optical cross-connect switches in said ring configuration, N being an integer greater than two, thereby forming an optical ring network, and in the event any of said N working optical channels provided between a first pair of adjacent optical cross-connect switches are not available for carrying data traffic said plurality of optical cross-connect switches are switched to loop-back said data traffic from said working channels onto said plurality of spare optical channels except said N spare optical channels provided between said first pair of adjacent optical cross-connect switches wherein said plurality of optical cross-connect switches are switched to form N spare optical channel rings using said N spare optical channels provided between said each pair of adjacent optical cross-connect switches in said ring configuration.

7. The optical network of claim 6 wherein at least two of said plurality of optical cross-connect switches are optically coupled to one or more optical cross-connect switches that form part of a mesh network.

8. The optical network of claim 7, wherein one of said plurality of spare optical channels is shared with said mesh network such that in the event of a failure in said mesh network said one of said plurality of spare optical channels carries data traffic originating in said mesh network.

9. An optical network, comprising:
    a plurality of optical cross-connect switches, including first, second, and third optical cross-connect switches, wherein at least two of said plurality of optical cross-connect switches are optically coupled to one or more optical cross-connect switches that format of a mesh network;
    a plurality of spare optical channels, wherein one of said plurality of spare optical channels is shared with said mesh network such that in the event of a failure in said mesh network said one of said plurality of spare optical channels carries data traffic originating in said mesh network;
    a plurality of working optical channels, wherein said plurality of optical cross-connect switches are optically coupled in a ring configuration using said plurality of working optical channels and said plurality of spare optical channels such that N spare optical channels and N working optical channels are provided between each pair of adjacent optical cross-connect switches in said ring configuration, N being an integer greater than zero, thereby forming an optical ring network, wherein said optical ring network includes means for establishing a priority of use of said spare optical channel shared with said mesh network such that said spare optical channel shared with said mesh network is utilized by said mesh network only when there are no failures in said optical ring network; and
    in the event any of said N working optical channels provided between a first pair of adjacent optical cross-connect switches are not available for carrying data traffic, said plurality of optical cross-connect switches are switched to loop-back said data traffic from said working channels onto said plurality of spare optical channels except said N spare optical channels provided between said first pair of adjacent optical cross-connect switches.

10. A method for creating an optical network that exhibits the simplicity and fast switching of an ADM ring network and offers the spare efficiency and ease of growth characteristics of a mesh network, comprising the steps of:

optical coupling a plurality of optical cross-connect switches in a ring configuration using a plurality of working optical channels and a plurality of spare optical channels such that a spare optical channel and a working optical channel is provided between each pair of adjacent optical cross-connect switches in said ring configurations;

transmitting data traffic between a first pair of adjacent optical cross-connect switches using said working optical channel provided between said first pair of adjacent optical cross-connect switches;

optically coupling at least two of said plurality of optical cross-connect switches to one or more optical cross-connect switches that form part of an optical mesh network;

in the event said working optical channels provided between said first pair of adjacent optical cross-connect switches is not available for transmitting data traffic, transmitting said data traffic between said first pair of adjacent optical cross-connect switches using said plurality of spare optical channels except said spare optical channel provided between said first pair of adjacent optical cross-connect switches; and switching said plurality of optical cross-connect switches to form a spare optical channel ring using said plurality of spare optical channels.

11. The method of claim 10 further comprising the step of sharing one of said plurality of spare optical channels with said mesh network such that in the event of a failure in said mesh network said one of said plurality of spare optical channels carries data traffic originating in said mesh network.

12. The method of claim 11 further comprising the step of establishing a priority of use of said spare optical channel shared with said mesh network such that said spare optical channel shared with said mesh network is utilized by said mesh network only when there are no failures in said plurality of working optical channels.

13. The method of claim 10, further comprising the step of utilizing spare capacity within said mesh network to recover from more than one failure within said ring configuration.

14. A method for enabling an optical cross-connect switch to participate in both a ring configuration and a mesh configuration, comprising the steps of:

provisioning a first set of ports in the optical cross-connect switch to support ring traffic;

provisioning a second set of ports in the optical cross-connect switch to support mesh traffic connecting a set ports in to a first working optical channel;

connecting second port from said first set to a first spare optical channel;

connecting a third port from said first set to a second working optical channel;

connecting a fourth port from said first set to a second spare optical channel;

connecting a fifth port from said first set to a first network node;

connecting a sixth port from said first set to a second network node;

switching said fifth port to said first port, wherein an optical signal transmitted from said first network node is transmitted onto said first working optical channel;

switching said sixth port to said third port, wherein an optical signal transmitted from said second network node is transmitted onto said second working optical channel; and switching said second port to said fourth port, thereby connecting said first spare optical channel to said second spare optical channel.

15. The method of claim 14, further comprising the step of switching said fifth port to said fourth port in the event of a failure in said first working optical channel.

* * * * *